(12) United States Patent
Shintani et al.

(10) Patent No.: US 8,396,748 B2
(45) Date of Patent: Mar. 12, 2013

(54) ACTIVATING LICENSABLE COMPONENT OF CONSUMER ELECTRONIC DEVICE AT POINT OF SALE

(75) Inventors: Peter Shintani, San Diego, CA (US); Aran London Sadja, San Diego, CA (US); Ludovic Douillet, Escondido, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/049,021

(22) Filed: Mar. 16, 2011

(65) Prior Publication Data

US 2012/0123885 A1 May 17, 2012

Related U.S. Application Data

(60) Provisional application No. 61/412,552, filed on Nov. 11, 2010.

(51) Int. Cl.
*G06Q 20/00* (2012.01)
(52) U.S. Cl. ......... 705/21; 705/16; 705/17; 340/825.69; 725/81; 715/718; 235/379
(58) Field of Classification Search ............ 705/21, 705/16, 17, 18; 340/5.81, 10.4; 235/379, 235/380
See application file for complete search history.

(56) References Cited

U.S. PATENT DOCUMENTS

| | | | | |
|---|---|---|---|---|
| 6,199,044 | B1 * | 3/2001 | Ackley et al. ............... | 704/275 |
| 6,827,260 | B2 * | 12/2004 | Stoutenburg et al. ......... | 235/380 |
| 7,350,707 | B2 * | 4/2008 | Barkan et al. ................ | 235/454 |
| 7,508,459 | B2 | 3/2009 | Mayer et al. | |
| 2002/0049717 | A1 | 4/2002 | Routtenberg et al. | |
| 2005/0039025 | A1 | 2/2005 | Main et al. | |
| 2006/0022034 | A1 * | 2/2006 | Barkan et al. ................ | 235/380 |
| 2006/0059571 | A1 | 3/2006 | Chen et al. | |
| 2006/0088010 | A1 | 4/2006 | Buchwald et al. | |
| 2006/0106726 | A1 | 5/2006 | Raley et al. | |
| 2006/0146200 | A1 | 7/2006 | Edde et al. | |
| 2007/0027815 | A1 | 2/2007 | Sobel et al. | |
| 2007/0174919 | A1 | 7/2007 | Raines et al. | |
| 2008/0083040 | A1 | 4/2008 | Dani et al. | |
| 2008/0134237 | A1 | 6/2008 | Tu et al. | |
| 2008/0250443 | A1 | 10/2008 | Fan et al. | |
| 2008/0313086 | A1 | 12/2008 | Milgramm | |
| 2009/0006225 | A1 | 1/2009 | Multerer et al. | |

(Continued)

OTHER PUBLICATIONS

Peter Shintani, Ludovic Etienne Douillet, Aran London Sadja, "Coordinating License Activation of Licensable Audio Video (AV) Device Components Between Contract Manufacturer and Brand Manufacturer", Non-final office action dated Jun. 1, 2012 in related U.S. Appl. No. 13/073,047.

(Continued)

*Primary Examiner* — Vanel Frenel
(74) *Attorney, Agent, or Firm* — John L. Rogitz

(57) ABSTRACT

A purchaser of a CE device informs a retail clerk, at the point of sale (POS) of features of the CE device the purchaser wishes to employ, some of which require a license. The CE device is vended without the licenses but the clerk can upload the desired features to a server, which correlates the features to licensable components and which returns to the POS the license codes needed to enable the components. The codes can be provided to the CE device using RFID at the POS, or storing the codes on a removable storage at the POS and giving the storage to the purchaser, or by printing the codes as bar codes in the sales receipt at the POS and giving the receipt to the purchaser, who later scans the codes past a camera of the CE device to enable the associated licensable components.

19 Claims, 10 Drawing Sheets

U.S. PATENT DOCUMENTS

| | | | |
|---|---|---|---|
| 2009/0019501 | A1 | 1/2009 | Saxena et al. |
| 2009/0212909 | A1* | 8/2009 | Burger et al. ............ 340/5.81 |
| 2009/0293560 | A1 | 12/2009 | Ikeguchi |
| 2009/0319410 | A1 | 12/2009 | Knight et al. |
| 2009/0320073 | A1 | 12/2009 | Reisman |
| 2010/0156592 | A1 | 6/2010 | Lewis |
| 2010/0164681 | A1 | 7/2010 | Harris |
| 2010/0218181 | A1 | 8/2010 | Seiden |
| 2011/0054923 | A1 | 3/2011 | Miloslavsky et al. |
| 2011/0166968 | A1 | 7/2011 | Houng et al. |
| 2011/0302623 | A1 | 12/2011 | Ricci |

OTHER PUBLICATIONS

Peter Shintani, Ludovic Etienne Douillet, Aran London Sadja, "Coordinating License Activation of Licensable Audio Video (AV) Device Components Between Contract Manufacturer and Brand Manufacturer", Applicants response to Non-final office action dated Jun. 1, 2012 in related U.S. Appl. No. 13/073,047, filed Jun. 11, 2012.

Peter Shintani, Ludovic Douillet,"Activating Licensable Component Provided by Third Party to Audio Video Device", related pending U.S. Appl. No. 13/034,179, filed Feb. 24, 2011.

Peter Shintani, Ludovic Douillet, "Activating Licensable Component Using Aggregating Device in Home Network", related pending U.S. Appl. No. 13/034,093, filed Feb. 24, 2011.

Peter Shintani, Aran Sadja, Theodore R. Booth, Ludovic Douillet, "Reducing TV Licensable Costs", related pending U.S. Appl. No. 12/970,215, filed Dec. 16, 2010.

Peter Shintani, Aran Sadja, Ludovic Douillet, "Activating Licensable Component of Consumer Electronic Device Post-Sale Using Software Package", related pending U.S. Appl. No. 13/072,941, filed Mar. 28, 2011.

Peter Shintani, Aran Sadja, Ludovic Douillet, "Tracking Details of Activation of Licensable Component of Consumer Electronic Device", related pending U.S. Appl. No. 13/072,978, filed Mar. 28, 2011.

Peter Shintani. "Tracking Activation of Licensable Component in Audio Video Device by Unique Product Identification", related pending U.S. Appl. No. 13/048,981, filed Mar. 16, 2011.

Peter Shintani, Stephane LeJeune, Robert Blanchard, Graham Clift, "Audio Video Device with Externally Bundled TV Tuner", related pending U.S. Appl. No. 13/073,222, filed Mar. 28, 2011.

Peter Shintani, "Supplying Omitted Critical Code portion to Activate Licensable Component in Audio Video Device", related pending U.S. Appl. No. 13/045,835, filed Mar. 11, 2011.

Peter Shintani, Ludovic Douillet, Aran Sadja, "Coordinating License Activation of Licensable Audio Video (AV) Device Components Between Contract Manufacturer and Brand Manufacturer", related pending U.S. Appl. No. 13/073,047, filed Mar. 28, 2011.

Peter Shintani, Ludovic Etienne Douillet, Aran London Sadja, co-pending U.S. Appl. No. 13/073,047, titled "Coordinating Licence Activation of Licensable Audio Video (AV) Device Components Between Contract Manufacturer" final office action dated Aug. 28, 2012.

Peter Shintani, Aram Sadja, Theodore R. Booth, Ludovic Douillet, "Reducing TV Licensing Costs", related pending U.S. Appl. No. 12/970,215 non-final office action dated Jun. 18, 2012.

Peter Shintani, Aram Sadja, Theodore R. Booth, Ludovic Douillet, "Reducing TV Licensing Costs", related pending U.S. Appl. No. 12/970,215 applicants response filed Jun. 22, 2012 to the non-final office action dated Jun. 18, 2012.

* cited by examiner

SYSTEM

TV

SETUP LOGIC

AUTO LICENSE LOGIC

VIA WEB

ACTIVATING LICENSABLE COMPONENT OF CONSUMER ELECTRONIC DEVICE AT POINT OF SALE

This application claims priority to U.S. patent application Ser. No. 12/970,215, filed. Dec. 16, 2010 and to U.S. provisional patent application Ser. No. 61/412,552, filed Nov. 11, 2010.

FIELD OF THE INVENTION

The present application relates generally to activating a licensable component of a consumer electronic (CE) device at the point of sale (POS) of the device.

BACKGROUND OF THE INVENTION

Televisions incorporate a host of technologies to enable a viewer to watch programming from a variety of sources. These sources include terrestrial broadcast sources of analog (using National Television System Committee, or NTSC, format) and digital (using Advanced Television System Committee, or ATSC, format) TV signals. ATSC signals typically use video compression known as Motion Picture Experts Group (MPEG-2) and TVs must consequently support MPEG-2 decompression if they support ATSC programming.

Cable-provided "basic" television programming can also be provided in NTSC or quadrature amplitude modulation (QAM) format. Cable-provided "enhanced" programming may also be provided using high definition multimedia interface (HDMI) principles. Likewise, satellite-provided TV signals may be received in HDMI. As well, video from the Internet can be displayed on many modern TVs in a variety of formats, including data over cable service Internet specification (DOCSIS) format. Furthermore, TVs are often configured to support multiple audio formats, including advanced audio coding (AAC), Audio code 3 (AC3), digital theater system (DTS), and so on. And as contemporary viewers know, TVs are expected to support the presentation of electronic program guides (EPGs).

SUMMARY OF THE INVENTION

As understood herein, various TV technologies require license fees to be paid. As further understood herein, many technologies that must be built in to modern TVs to support various program sources may not be used. Nonetheless, license fees for the unused technologies are still paid, unnecessarily cascading cost. Present principles understand that license fees might be saved were licensable components to be activated only upon consumer request.

Accordingly, a consumer electronics (CE) device includes a processor controlling one or more licensable components, at least one of which requires a license code to enable. The license code is not available to the processor at a point of sale (POS) of the CE device until a transaction for the CE device has been satisfied. The CE device also has a display controlled by the processor and a computer readable storage medium bearing instructions executable by the processor to, pursuant to satisfying the transaction, receive at least one license code associated with at least one licensable component. The license code is provided through a point of sale terminal (POST) and does not have to be typed in to the CE device by a person to make the license code available to the processor. Using the license code, the processor enables operation of the licensable component, which otherwise is not enabled for operation without the license code.

If desired, the processor receives the license code from a radiofrequency identification (RFID) device communicating with the processor. The RFID device stores the license code received from an RFID device of the POST. Or, the professor can receive the license code from a removable storage medium removably engageable with the CE device. The removable storage medium stores the license code written to it by the POST. Yet again, the processor may receive the license code from an imaging device reading the license code from a substrate printed by a printer associated with the POST.

In another aspect, a point of sale terminal (POST) has a processor and a computer readable storage medium accessible by the processor and bearing instructions to cause the processor to receive a purchaser-desired feature of a consumer electronics (CE) device. The purchaser-desired feature implicates a license for a licensable component of the CE device. The processor transmits data representing the purchaser-desired features to a server and receives from the server in response to the data representing the purchaser-desired features a license code. The processor provides the license code to the CE device and/or to a purchaser thereof.

In another aspect, a method includes receiving, from a point of sale (POS) of a consumer electronics (CE) device, desired features of the CE device as defined by a purchaser of the CE device. Using a terminal at the POS, the CE device and/or the purchaser thereof is provided with at least one license code required to enable the feature to function on the CE device without requiring the license code to be typed into the CE device.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
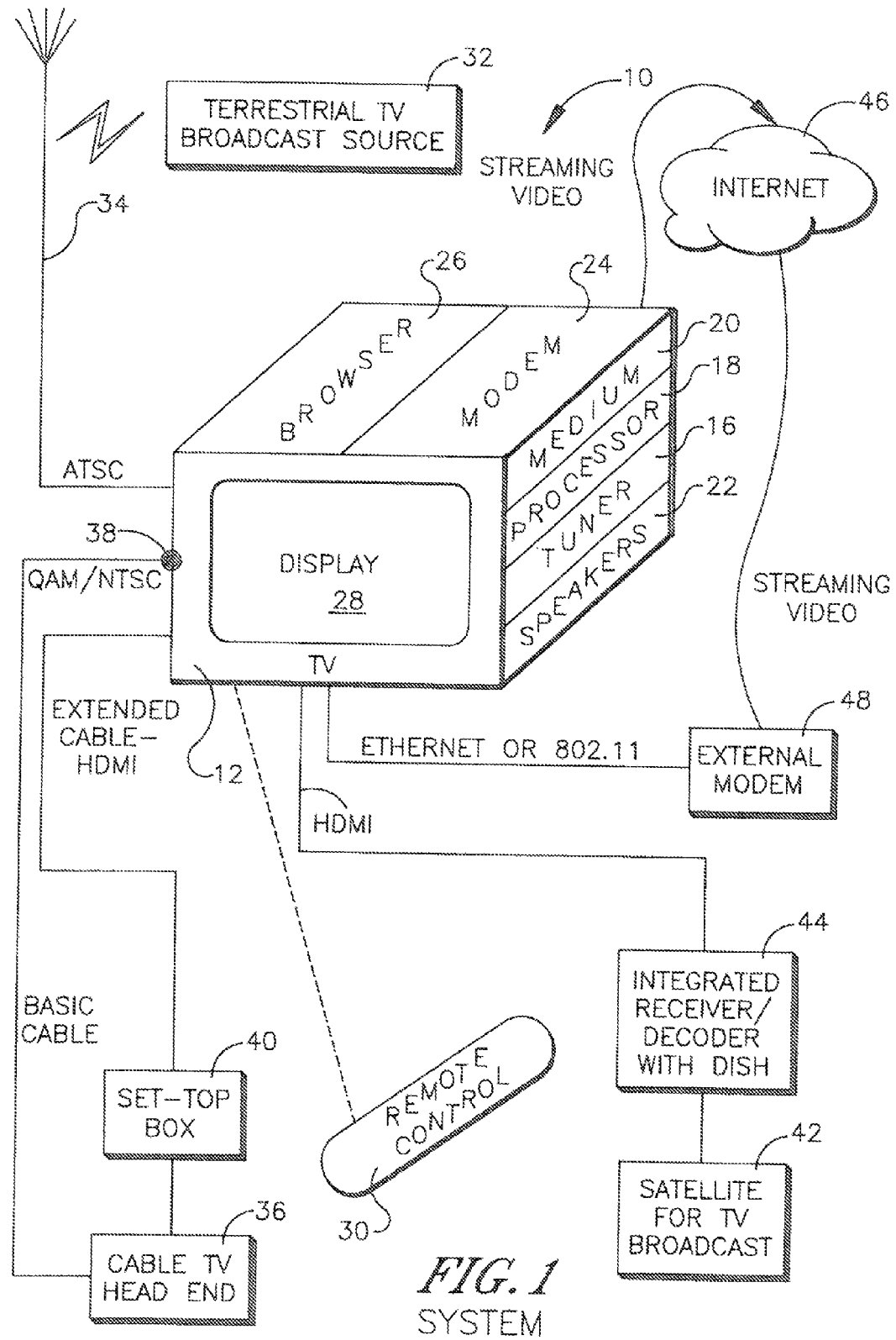
FIG. 1 is a block diagram of a non-limiting example system in accordance with present principles.

Referring initially to the non-limiting example embodiment show in FIG. 1, a system 10 includes an audio video device 12 such as a TV including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 18 which may execute a software-implemented browser 26. Video is presented under control of the TV processor 18 on a TV display 28 such as but not limited to a high definition TV (HDTV) flat panel display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

Figure 2:
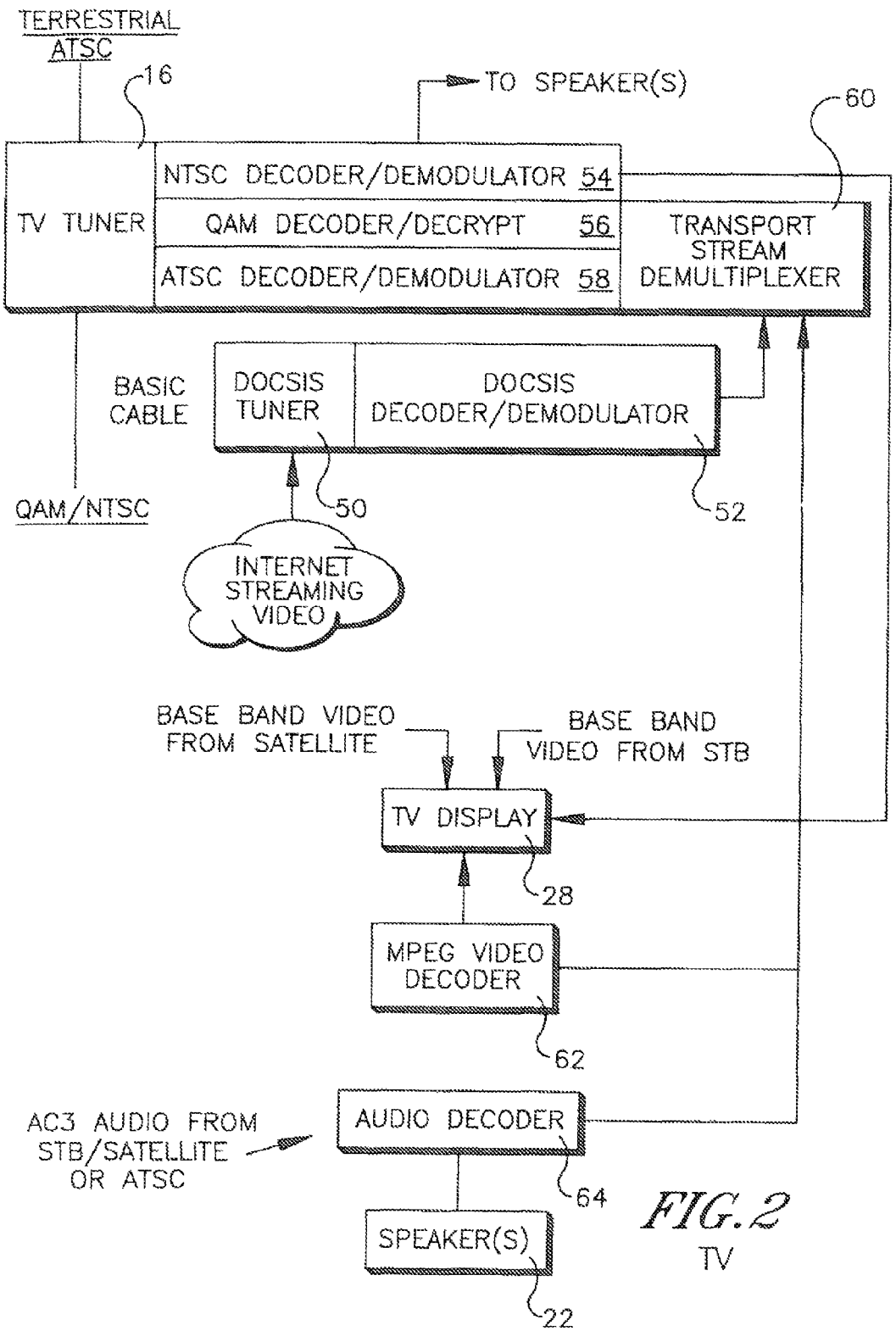
FIG. 2 is a block diagram of an example TV.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at, a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as, shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Figure 3:
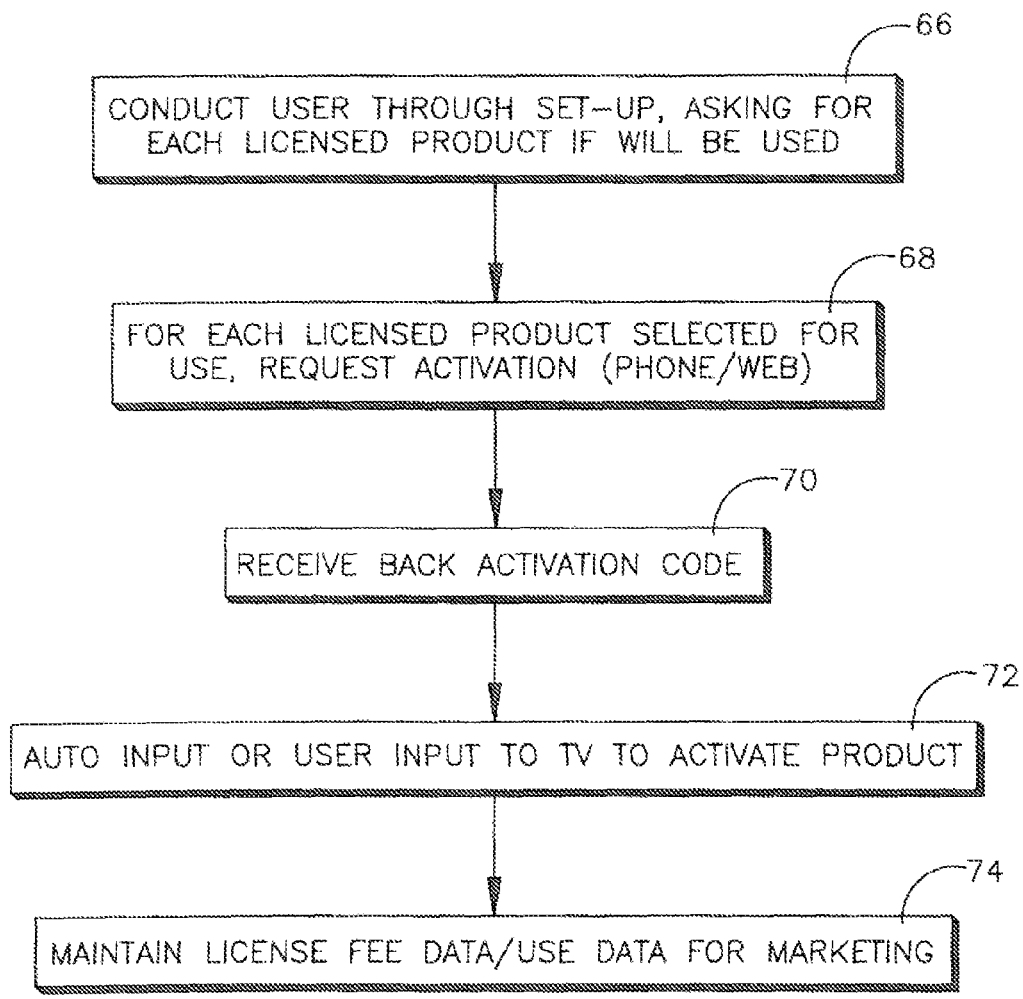
FIG. 3 is a flow chart of non-limiting TV set up logic in accordance with, present principles.

Now referring to FIG. 3, at block 66 a user of the TV 12 can be conducted, using onscreen user interfaces (UI), through a set-up routine upon first power on or thereafter from a menu to set up various features of the TV. As an example, the user may be asked, for one or more licensable components within the TV, if the user desires to use that component. This may be done implicitly, e.g., by asking the user if the user wishes to automatically scan the broadcast spectrum to detect channels, in which case it may be inferred that the ATSC decoder/demodulator 58 and MPEG decoder 62 will be required and, hence, that licenses to use those components will be needed. Also, in this latter case it may be inferred that a license to the terrestrial broadcast EPG may be required, whereas such a license would not be required if terrestrial broadcast were not being used as an input source.

Or again, the user may be given the choice to receive Internet video through the built-in modem 24 or from an external modem 48 and if the latter is chosen, no license need be obtained for the internal browser 26; otherwise, a license may be required to use the internal browser 26.

Proceeding to block 68, for each license that is inferred to be required based on the user set-up selections at block 66, the TV 12 uploads a request for the license over the Internet, for example, or back through a two-way cable system, etc. Or, as explained further below the request may be made by telephone. Regardless of how made, the request typically identifies the component for which a license is required based on user, input at block 66 along with a unique identification of the TV, e.g., a hash of the TV model number and serial number, in some embodiments encrypted if desired. Or, the unique identifier may be a high definition content protect (HDCP) key selection vector (KSV) of the device 12, or a media access control (MAC) address, or a digital transmission content protect (DTCP) certificate, one or more of which may be hashed with the serial number and/or model name of the device 12. This hashed result can be sent to the server. The server can now uniquely identify the device. In the event the device needs to be repaired and the unique ID contained in the device is changed, the device's previous identity advantageously can be migrated to a new hashed ID. To simplify this migration of the ID, the server can generate a unique key, and send it to the repaired device after receiving the initial hashed ID and notification (e.g., from the device 12) that the device was repaired and requires a new unique ID. In some implementations the user of the device 12 can manually recall the original ID, send it to the server, and the server, using the original ID, migrates records of the licenses previously enabled by the device 12 to the new ID.

The request may be made at set-up time. Alternatively, the request may be cached for later upload when, e.g., an appropriate broadband connection is sensed. In any case, the request may be sent to an Internet server at a prestored Internet address or to a cable head end or to another appropriate licensing entity or agent.

Block 70 indicates that assuming it passes authentication the TV 12 receives back the license in the form of licensing information, typically a code that must be input to the TV processor 18 to enable or unlock the associated component. Or the associated component may require software code to function and a critical piece of the code which is related to the licensable feature may be omitted when the device is vended, with this critical piece of code being supplied at block 70 to enable the licensable feature of the component. Prior to provision of the critical piece of code, the licensable feature of the component in effect is not merely locked out, but rather is effectively missing altogether, even though other parts of software code needed to execute the licensable feature are vended with the device.

The code may be automatically input to the appropriate internal components of the TV at block 72 or the code may be displayed on the TV and the user prompted by means of an onscreen UI to enter the code using, e.g., the RC 30. Proper input of the code activates the related component within the TV. Block 74 simply indicates that license fee data is maintained and used to generate billing information from the licensing agency to the manufacturer of the TV, and may also be used to generate marketing data as discussed further below. The data may be kept in the TV until uploaded to a licensing entity/agent by means noted above.

Figure 4:
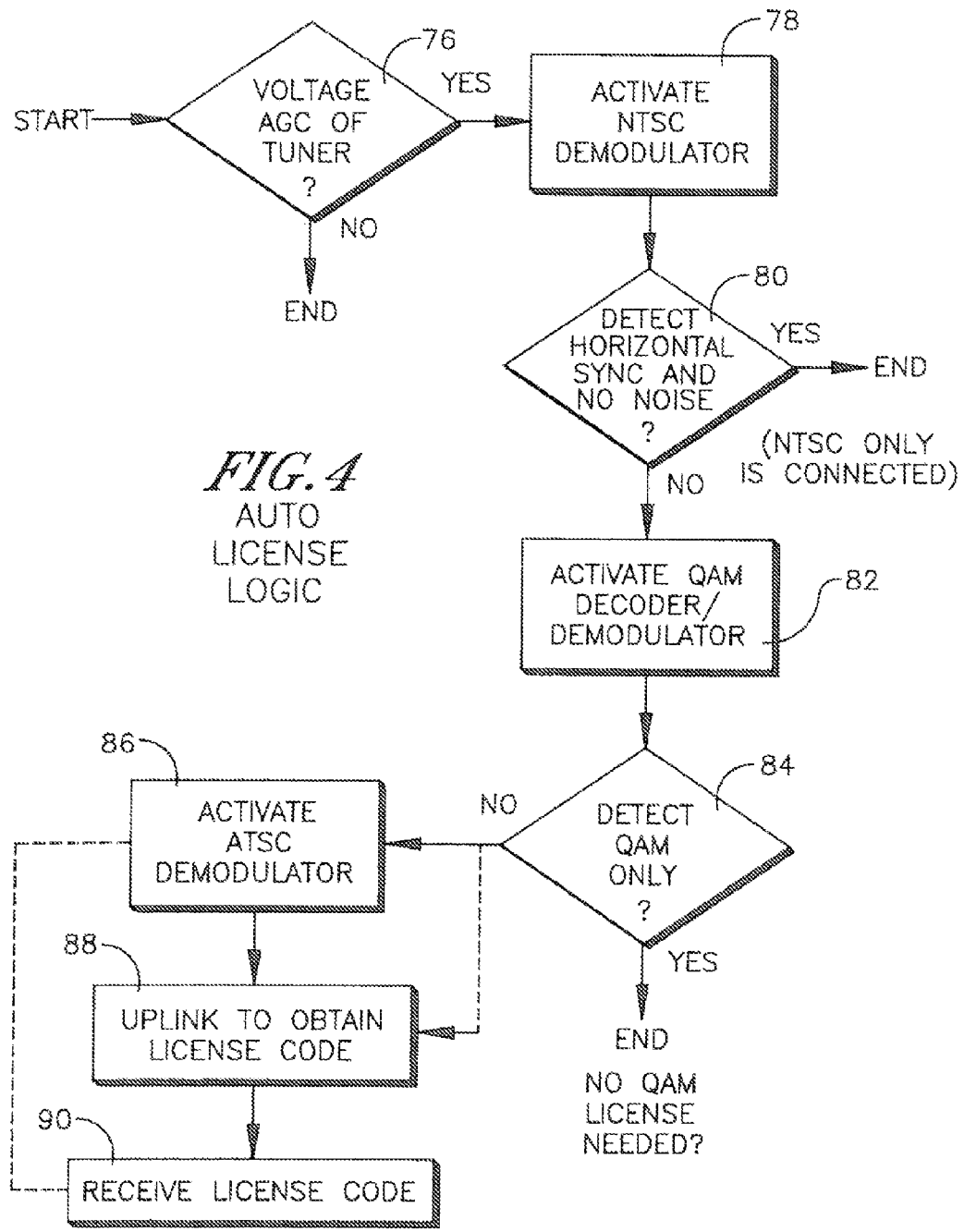
FIG. 4 is a flow chart of non-limiting logic for automatically detecting whether an ATSC demodulator is required to be activated.

FIG. 4 shows that automatic license determinations may be made outside of a user set-up routine if desired. In the example shown in FIG. 4, commencing at decision diamond 76 it is determined whether a predetermined physical condition exists in the TV, e.g., a particular kind of connection, from which it may be inferred what licensable components will be required. In the example of FIG. 4, the physical condition is the presence of a voltage in the automatic gain control (AGC) circuitry of the tuner 16, which would occur when, for instance, a connection is made at the TV chassis to the terrestrial antenna 34 or when a cable from the wall is connected to the F-type connector 38.

When the tested-for physical condition exists, the logic flows to block 78, in this example to activate the NTSC demodulator 54. This is done recognizing that NTSC demodulators typically require no licenses, so to avoid unnecessarily requesting licenses, the signal at the tuner 16 is first tested to determine if it is an NTSC signal. Decision diamond 80 indicates that the test may be whether "noise", is present in the signal.

If the test indicates that NTSC signals only are present the logic ends, but otherwise the logic flows to block 82 to activate the QAM decoder/demodulator 56. If QAM only is detected (by the QAM decoder/demodulator 56 recognizing QAM signals and/or no noise) the logic ends, but if the QAM decoder/demodulator 56 does not recognize the signal, this indicates that the signal is neither QAM nor (from decision diamond 80) NTSC, with the inference thus being that the signal is ATSC requiring use of the ATSC decoder/demodulator 58, which is activated at block 86 to process the signal. At block 88 an uplink is obtained by the TV processor 18' to the above-described licensing entity/agent to obtain the license code discussed above using the unique ID of the TV, and at block 90 the code is received and used as necessary to permit use of the ATSC decoder/demodulator 58.

Or, the step at block 90 can be omitted and the ATSC decoder/demodulator 58 immediately activated on the assumption that the processor 18 is programmed to send a message to the licensing entity/agent that licensing accounting is to be generated after activation of the ATSC decoder/demodulator 58.

Yet again, as shown in dashed lines in FIG. 4 the logic may flow first from decision diamond 84 to blocks 88 and 90 to obtain the licensing "unlock" code and then back to block 86 to activate the ATSC decoder/demodulator 58 using the code, to ensure that no use may be made of the ATSC decoder/demodulator 58 until such time as the licensing entity/agent has been informed of its use, has authenticated the TV for the necessary ATSC license, and has determined that under business rules the license code should be downloaded to fulfill the request.

Additional example inference rules that may be employed pursuant to automatically obtaining needed component licenses after vending the TV to avoid paying for unnecessary licenses prior to sale of the TV include, if there is ATSC present, it is less likely that QAM will be found; if ATSC is present, the total number of ATSC channels will be much smaller than the number for QAM channels. Also, when signals are received from an external modem 48, audio video programming does not require use of the built-in browser 26 and so receipt of video over an Ethernet link without receipt of signals at the internal modem 24 may be inferred to mean that the browser 26 is not in use.

Figure 5:
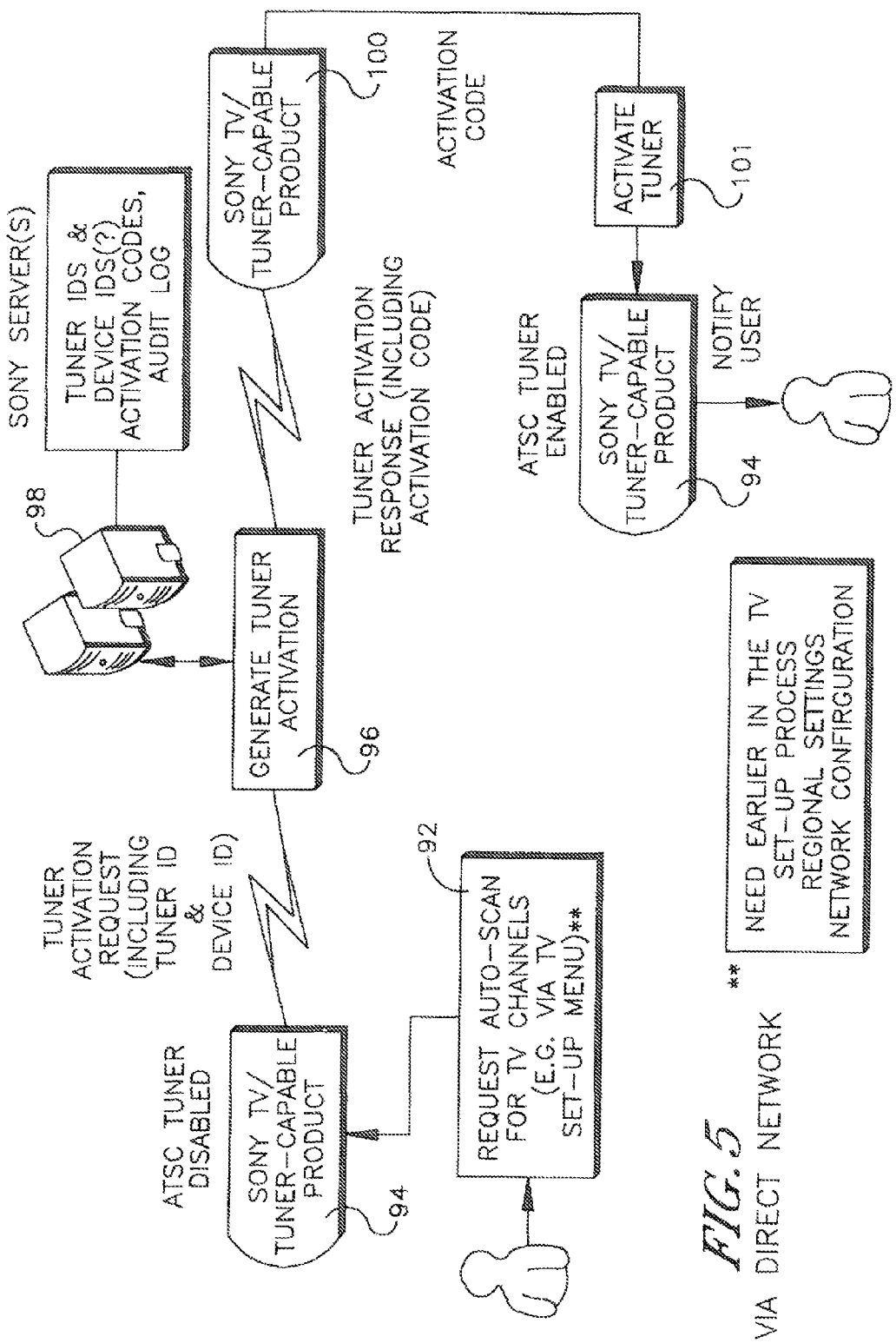
FIGS. 5-7 are schematic diagrams illustrating alternate methods for activating an ATSC demodulator.
Figure 6:
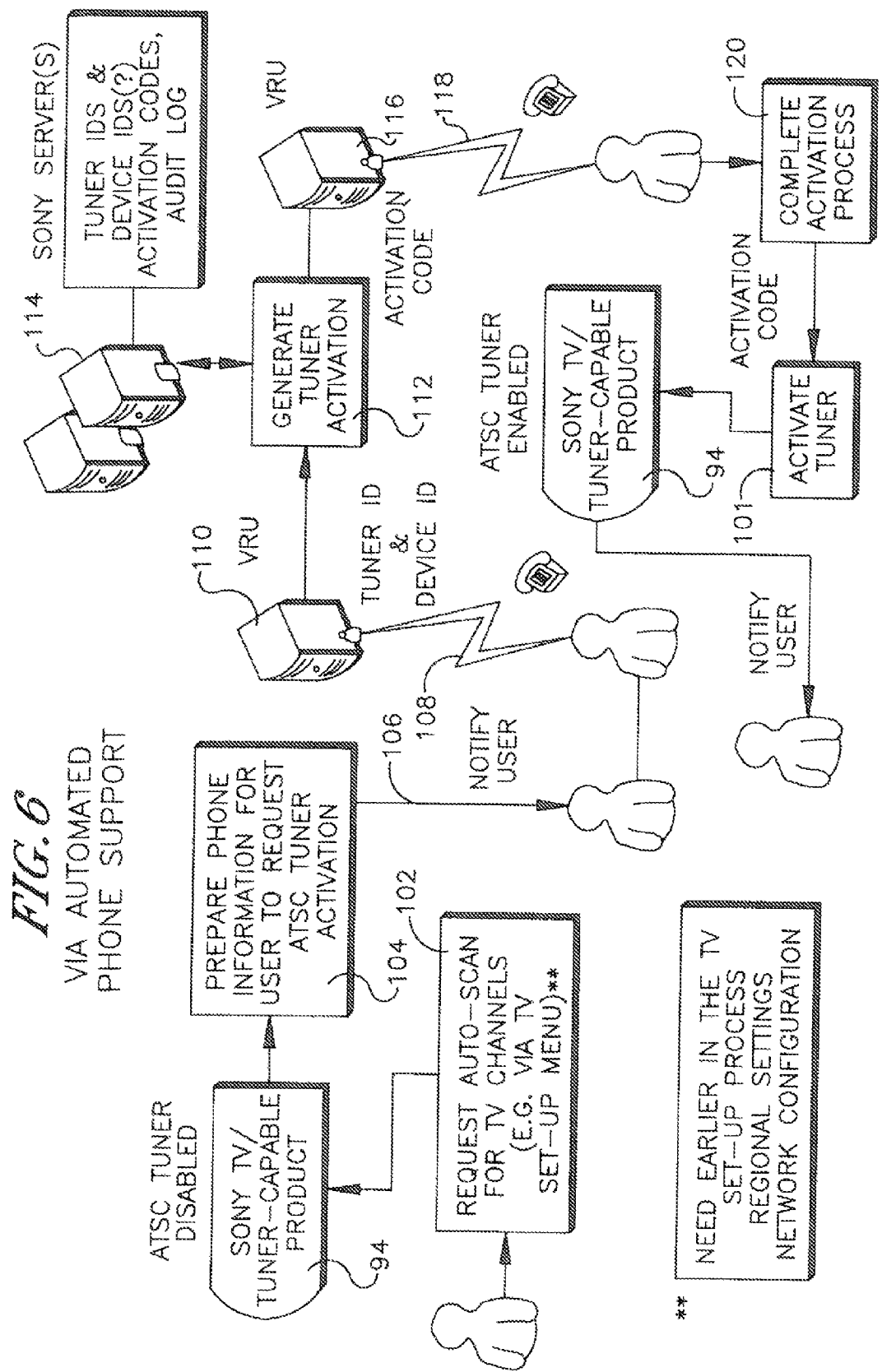
Figure 7:
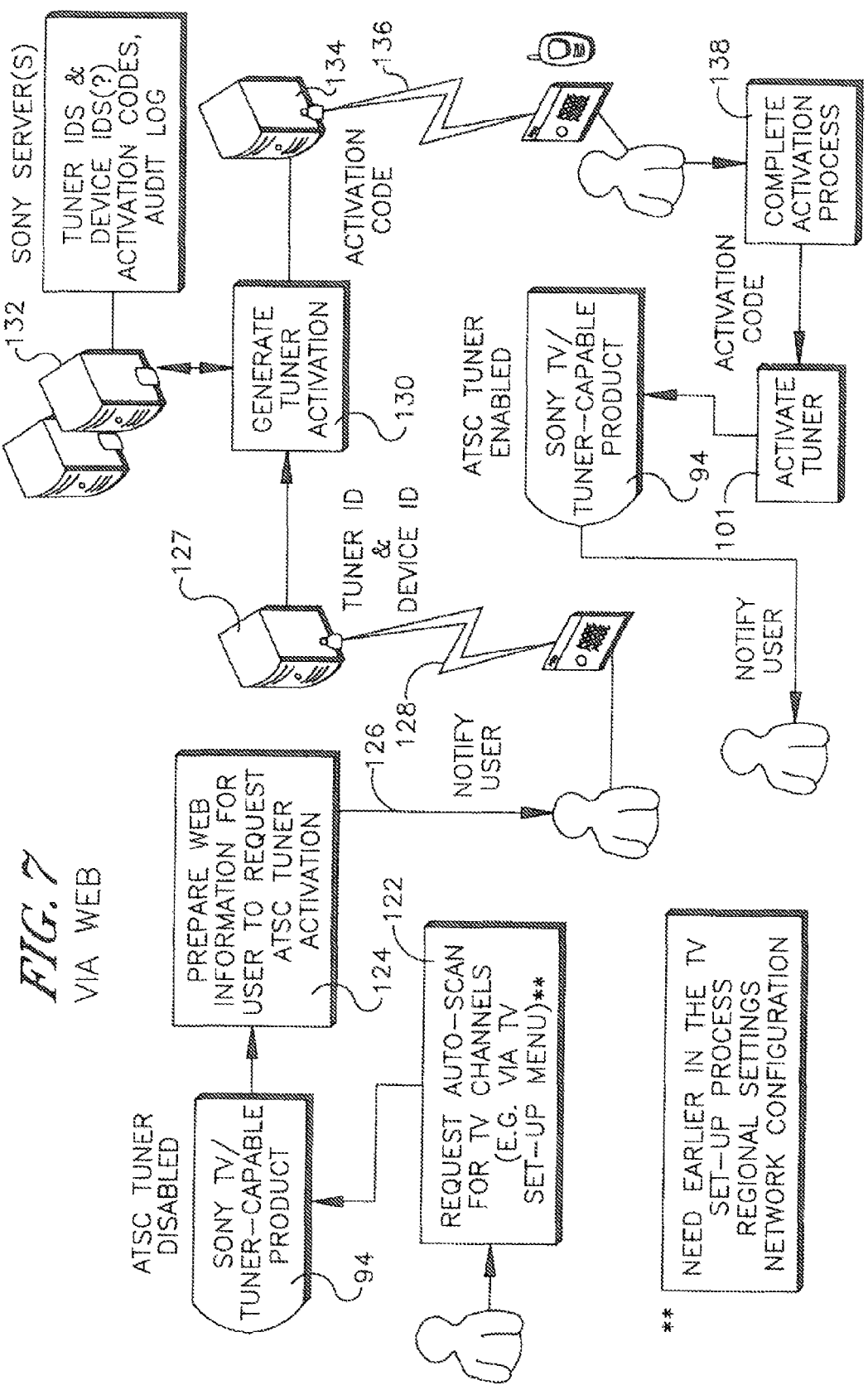

FIGS. 5-7 illustrate logic that may be used during setup to obtain licenses. Using, e.g., the RC 30, a person may input 92 a request to conduct auto-scan of available terrestrial or cable or satellite channels from, e.g., an onscreen setup menu presented on an audio video display product 94 (which may be implemented by the TV 12). In response, the AV display product sends an activation request for, e.g., the ATSC decoder/demodulator 58 which may include the tuner ID and product 94 ID and/or the decoder/demodulator 58 ID/product 94 ID. Activation of the ATSC decoder/demodulator 58 is executed at 96 using activation codes from one or more licensing entities/agents such as server 98, provided the licensing entities/agents determine, based on the information received from the product 94, that the product is entitled to a license for the requested component.

A log may be kept by the licensing entities/agents indicating what products and what components in those products have been activated and based on that log, licensing accounting data may be generated for purposes of presenting licensing invoices for activated components to the manufacturer of the product 94. In any case, 100 indicates that the product 94 receives the activation response, e.g., activation codes, to activate the demodulator/decoder 58 at 101, which converts the product 94 to an ATSC-capable device. The user may be notified using onscreen notification that ATSC programming may now be viewed using the product 94.

FIG. 6 shows an alternative embodiment. Using, e.g., the RC 30, a person may input 102 a request to conduct auto-scan of available terrestrial or cable or satellite channels from, e.g., an onscreen setup menu presented on an audio video display product 94 (which may be implemented by the TV 12). In response, at 104 telephone information including a phone number to a licensing entity/agent is, prepared and the user notified 106 of the information by means of, e.g., a user interface or prompt presented on the product 94. The user enters 108 the information into a telephone, either by speaking the number or by holding the telephone adjacent a speaker on the product 94 for receiving dual tone multifrequency (DTMF) tones from the product that are detected by the telephone and used to automatically dial the number using, e.g., a voice response unit (VRU) 110.

Other alternate embodiments involve sending short message service (SMS) messages to a server to send the above information or scanning bar-type codes on the TV or component to send the requisite information to the server to obtain the license. In any case, determining what licenses are needed may be accomplished upon start up and/or periodically during operation.

Tuner activation is generated at 112 by licensing entities/agents 114 such as Internet servers and the activation code discussed above sent 116 to the VRU 110, which presents the code to the user to complete the activation process at 120. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

FIG. 7 shows another alternative embodiment. Using, e.g., the RC 30, a person may input 122 a request to conduct auto-scan of available terrestrial or cable or satellite channels from, e.g., an onscreen setup menu presented on an audio video display product 94 (which may be implemented by the TV 12). In response, at 124 Internet information including an Internet address of a licensing entity/agent is prepared and the user notified 126 of the information by means of, e.g., a user interface or prompt presented on the product 94. The user enters 128 the information into, e.g., a home computer 127. Tuner activation is generated at 130 by licensing entities/agents 132 such as Internet servers and the activation code discussed above sent 134 to the computer, which presents 136 the code to the user by means of, e.g., a web page or telephone to complete the activation process at 138. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

Alternatively, licensing information may be exchanged using short message service (SMS) codes or by using bar codes. To use bar codes the TV can include a camera that images the bar codes on various components, which are interpreted by the processor 18 as identifying information.

In some instances, if only a limited number (e.g., two) NTSC channels are needed, a limited and less expensive license may be requested and granted to permit access to only those two channels through the NTSC demodulator with a license being requested and granted to any component such as a stereo audio decoder should the legacy device (typically, a VCR) use such audio.

Figure 8:
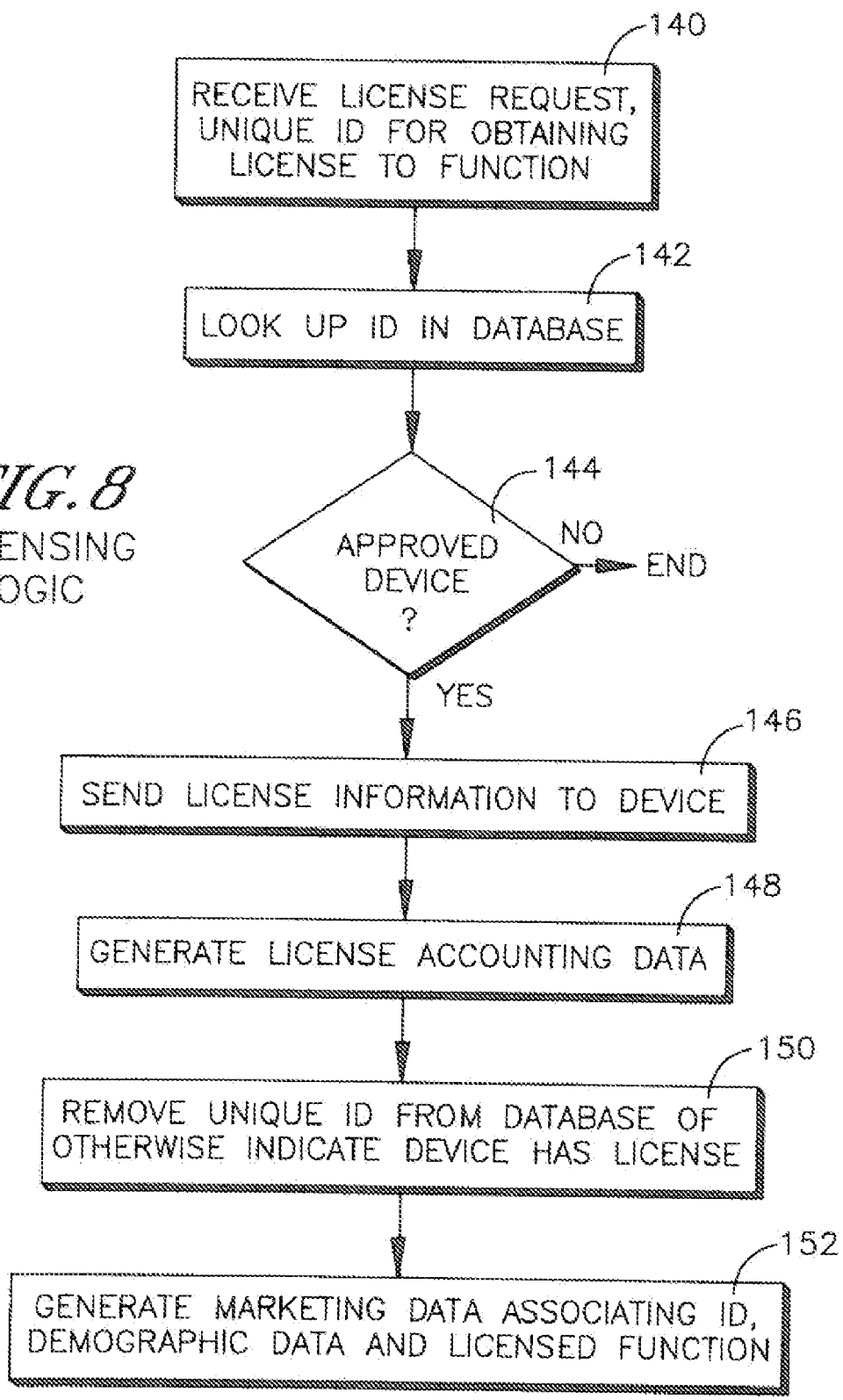
FIG. 8 is a flow chart of non-limiting logic for licensing a component in a TV.

FIG. 8 shows logic that may be executed by a licensing entity/agent computer. Commencing at block 140, a license request from, e.g., the TV 12 is received at, e.g., any of the above-described servers or head ends, which are programmed with software to execute the logic shown in FIG. 8. The unique ID discussed above is looked up at block 142 and the requesting device is authenticated at decision diamond 144 by, e.g., determining if the device is on a list of approved devices. If desired, it may be further determined whether a license for the particular licensable component that is the subject of the request has already been granted and if so, authentication fails. If the requesting device is approved and a license for the licensable component that is the subject of the request has not already been granted, the logic moves to block 146 to send license information, e.g., activation codes, to the requesting device.

Block 148 indicates that license accounting data is generated pursuant to sending the activation code to the requesting device. This accounting data can be used to effect remuneration from the manufacturer of the requesting device to the licensing authority for the component that is the subject of the request. At block 150 the authorized device database is modified to record the grant of the license.

Marketing data may be generated at block 152 based on the license grant. As an example, the total number of devices vended with the licensable component may be compared against the number of licenses granted to requesting devices to ascertain usage of the component compared to other components within the requesting device. For instance, it might be noted that 30% of vended devices of a particular TV model ever request activation of the ATSC tuner. This data can moreover be correlated to demographic data obtained during device registration so that, as an example, of the 30% of devices requesting activation of the TV tuner, it can be known which geographic region was more likely to request such activation, or which demographic age group, etc. It may be further ascertained, using device registration information submitted by purchasers, that of the devices requesting, activation of the ATSC tuner, for example, 90% of those devices were second or third home TVs that consequently can be inferred to lack a cable or satellite hookup.

It is preferred that once a licensable component has been activated by obtaining a license for it, it cannot subsequently be deactivated by the user, to avoid multiple license payments for the same component. Accordingly, the TV processor 18 may be programmed to refuse deactivation commands from the user if any are input for any component that has been activated and licensed, at least insofar as deactivation would require another license to reactivate.

Verification of license may also be provided by the TV processor so that, for example, if a component license is requested by the TV but the corresponding feature never used within some period of time, the TV can retract the license request and any license fees refunded as a result.

Figure 9:
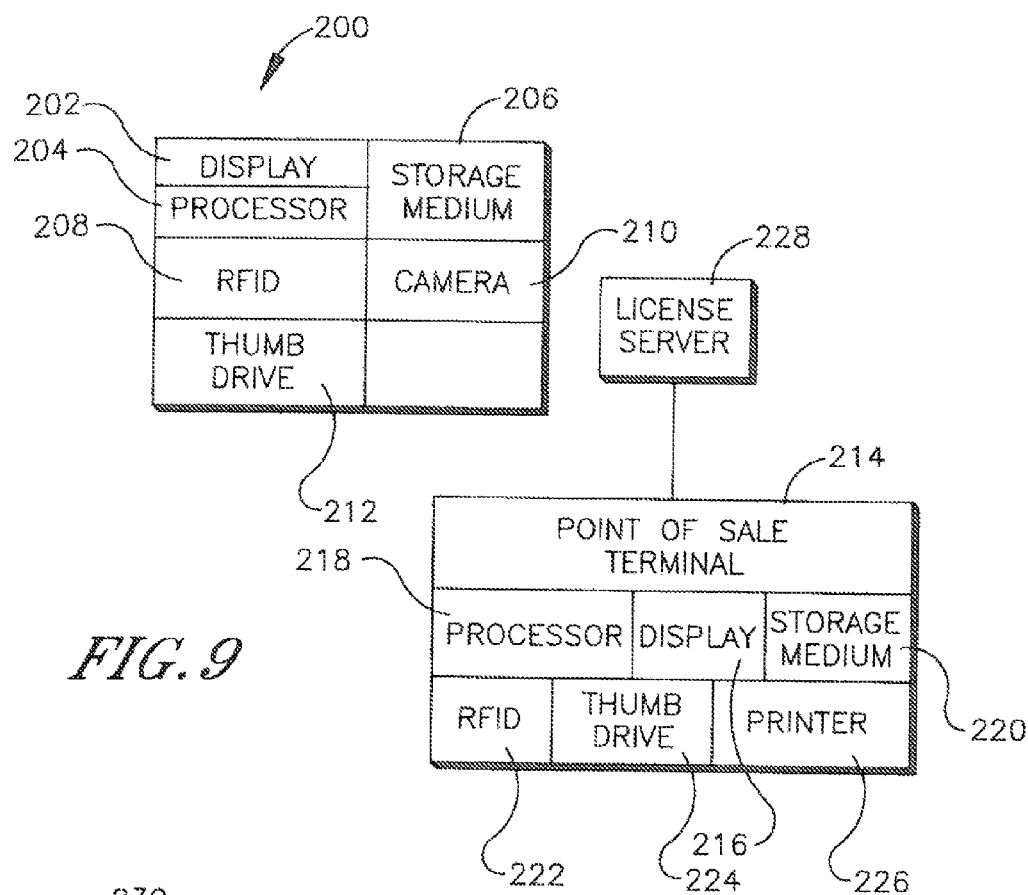
FIG. 9 is a block diagram showing a point of sale (POS) licensable component activation system.

FIG. 9 shows that a CE device 200 vended at a point of sale (POS) may include a display 202 controlled by a processor 204 accessing instructions on a computer readable storage medium 206 embodied as disk-based and/or solid state storage and/or other appropriate storage. In some embodiments described further below the CE device 200 may also have a radiofrequency identification (RFID) device 208 such as an RFID tag or dongle to receive RFID data. By RFID is meant to include short-range RF communications including Sony's Felica. A camera 210 may send image data to the processor 204, and the processor 204 may, receive information from a thumb drive 212 that is removable from the chassis of the device 200. In any case, the CE device 200 initially has less than all of its licensable components enabled or activated and to enable or activate a licensed component, requires a respective license code. In some cases the CE device 200 may be vended with licensable components such as but not limited to an ATSC demodulator, for instance, that requires, for enablement/activation, a license to for which a royalty has not been paid prior to vending the CE device 200.

When the CE device 200 is vended at the POS a retail clerk may use a POS terminal 214 to record the transaction. As shown, the POS terminal 214 may include a display 216 controlled by a processor 218 accessing instructions on a computer readable storage medium 220 embodied as disk-based and/or solid state storage and/or other appropriate storage. In some embodiments described further below the POS terminal 214 may also have an RFID transmitter 222 such as an RFID reader/writer to send RFID information to the CE device 200 through the device's RFID device 208 when the CE device 200 is still at the POS. Also, the POS terminal 214 may include a removable storage device 224 (referred to herein without limitation as a thumb drive 224) to which the terminal processor 218 may store data and which can engage the CE device 200 to function as the thumb drive 212 described above. A printer 226 may also be controlled by the POS terminal processor 218, and the POS terminal 214 may communicate transaction information to a license server 228 on a wide area network. The license server 228 may also send license information to the POS terminal 214.

Figure 10:
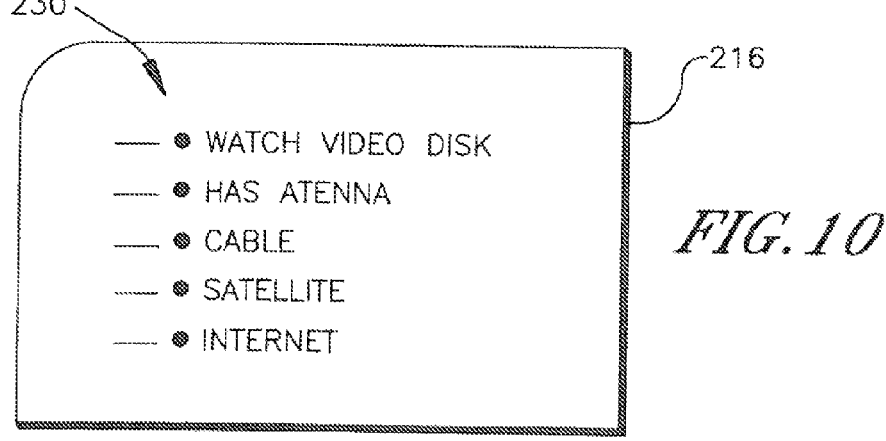
FIG. 10 is an example screen shot of a POS terminal allowing a clerk to input customer-desired features.

With the above architecture in mind, attention is now directed to FIG. 10, showing an example non-limiting screen shot of a user interface (UI) 230 that can be presented on the POS terminal display 216 pursuant to vending the CE device 200. A retail clerk can, inquire of the purchaser of the CE device 200 the purposes to which the purchaser wishes to put the CE device 200. In the case of a TV, for instance, the purchaser may inform the retail clerk that the purchaser does or does not intend to watch video disks using the CE device 200, the purchaser does or does not intend to use antenna input to the CE device 200, the purchaser does or does not intend to use cable input to the CE device 200, the purchaser does or does not intend to use satellite input to the CE device 200, the purchaser does or does not intend to use Internet connectivity using the CE device 200. Once the relevant elements selected by the purchaser are checked, the UI 230 may be uploaded to the license server 228.

Equivalently, the purchaser of the CE device 200 may fill out a soft copy or hard copy form similar to the UI 230 and upload or scan the form to the POS terminal 214 and/or license server 228. Provision may be made in accordance with disclosure above for the purchaser later to add licensable components to the CE device 200 with royalty payments for such held in abeyance until such time as the respective components are added. In lieu of listing features such as input sources, the UI may alternatively list the actual licensable components of the CE device 200 that are available for enabling.

Figure 11:
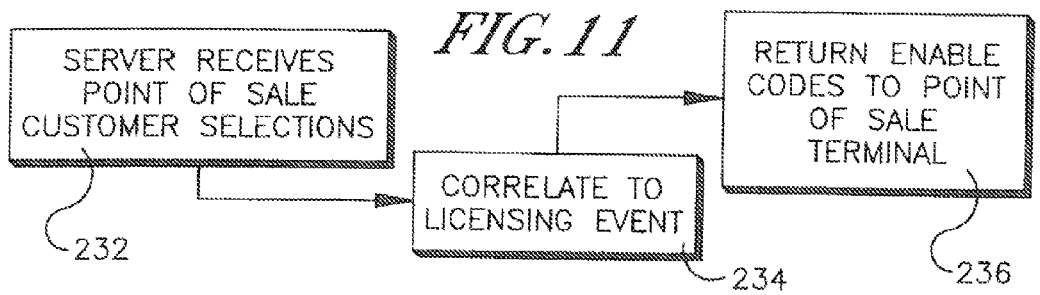
FIG. 11 is a flow chart of example server logic for correlating the features to license events.

FIG. 11 shows example logic that may be used by the license server 228 responsive to receiving input from the POS terminal 214 such as input from the UI 230. Commencing at block 232, the server 228 receives the customer selections made at the POS and input using, e.g., the POS terminal 214. Proceeding to block 234, the server 228 correlates the customer selections to licensing events.

Examples of correlations made at block 234 include not activating an ATSC demodulator in the CE device 200 and therefore not precipitating an ATSC royalty or licensing event if the purchaser has indicated that he will not use an antenna input, since the ATSC demodulator is used for terrestrial broadcast TV. Another example of a correlation made at block 234 is correlating a licensing event for HDMI/HDCP (and generating corresponding royalty information/payment therefore) if the purchaser has indicated that he intends to watch video disks, since many video disks can be expected to use HDMI and thus require activation/enablement of the corresponding component. Similarly, a licensing event for a browser can be correlated to a selection of "Internet" while no licensing event for satellite-related components in the CE device 200 are correlated to a selection of "no satellite". Multiple licensing events may be correlated to a single feature when multiple licensable components are required to provide the feature. In any case, it may now be appreciated that by enabling a purchaser to instruct a retail clerk as to familiar features the purchaser expects to use such as input sources like antenna, satellite, etc. and then correlating those features to associated licensable components such as an ATSC demodulator of which the purchaser and clerk may have little or no knowledge, provision of necessary license codes is facilitated transparently to typically non-technical purchasers and clerks.

More generally, a negative selection of a use or feature of the CE device 200 from the example UI 230 results in no license event being correlated for the associated licensable component in the CE device 200 and, thus, no royalty being generated or paid for the declined (non-selected) use or feature. On the other hand, a positive selection of a use or feature of the CE device 200 from the example UI 230 results in a license event being indicated or generated for the associated licensable component in the CE device 200 and, thus, a royalty being generated or paid or otherwise recorded or indicated for the accepted (selected) use or feature. For licensing events correlated to positive selections of uses or features, at block 236 the server 228 can return to the POS terminal 214 respective codes to enable respective licensable components in the CE device 200 that are associated with the uses or features positively indicated by the purchaser and input to the server using, e.g., the UI 230.

Figure 12:
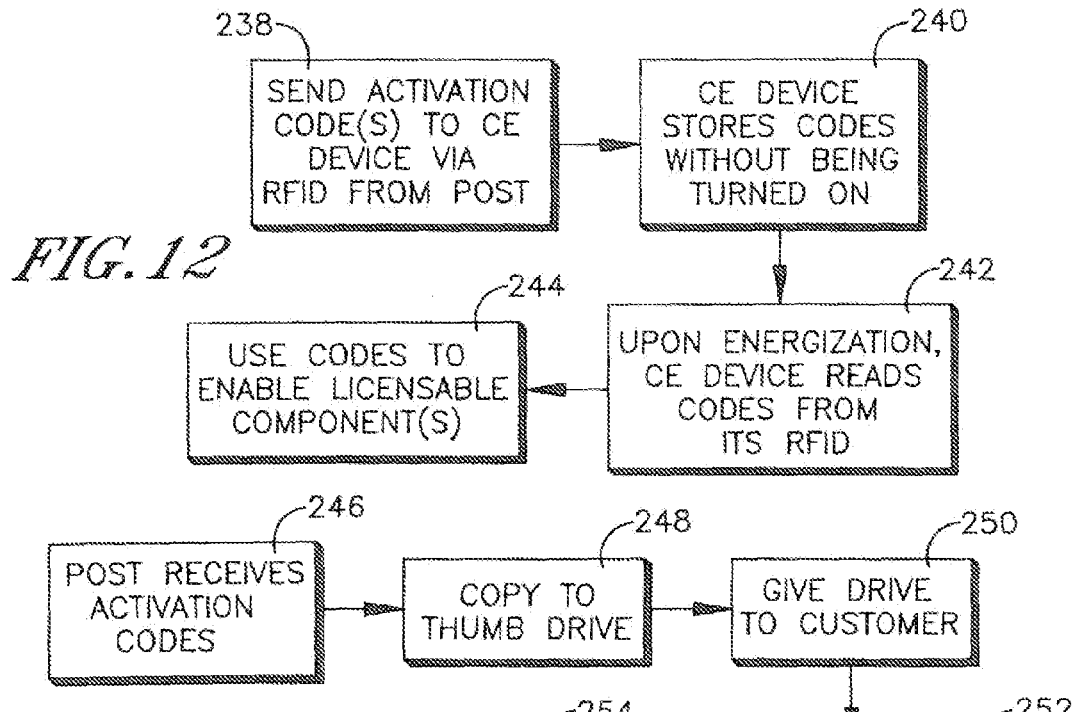
FIGS. 12-14 are flow charts of example logic for conveying license activation codes to the CE device.
Figure 13:
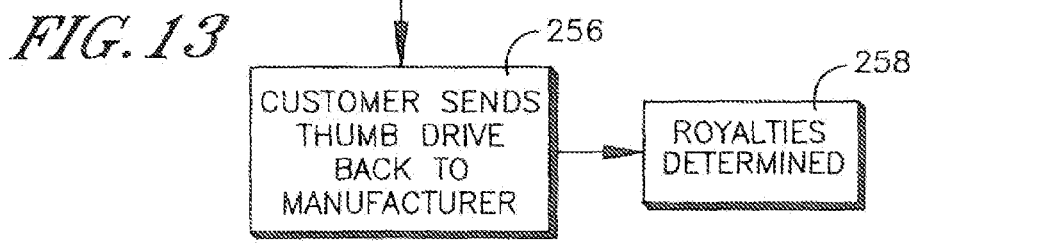
Figure 14:
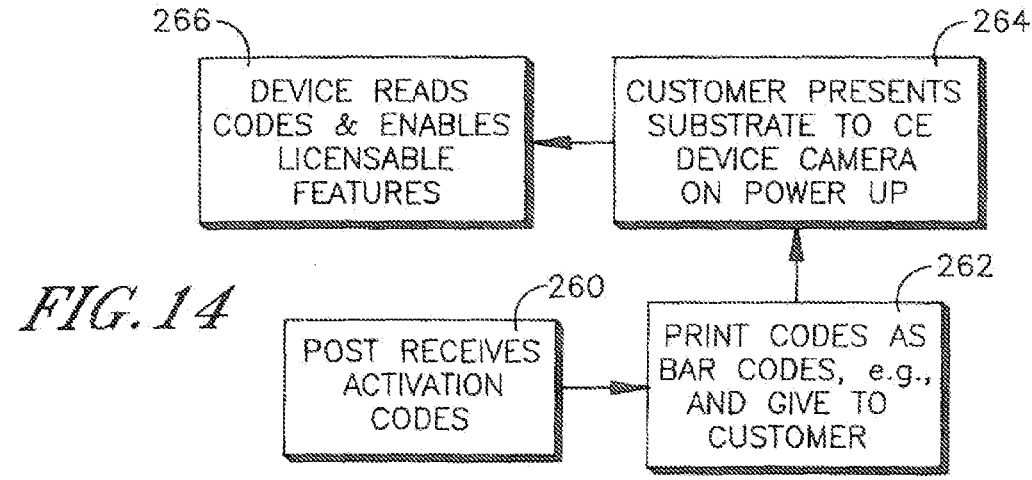

FIGS. 12-14 illustrate example paradigms for transferring the codes received at block 236 in FIG. 11 by the POS terminal 214 from the server 228 to the CE device 200, so that the processor 204 of the CE device 200 can use the codes to enable or activate the licensable components in accordance with principles above without requiring a person to physically type the codes into the CE device. Commencing at block 238 in FIG. 12, while the CE device 200 is present in the retail outlet pursuant to completing a transaction therefor, the POS terminal (POST) 214 sends the received codes from the server 228 to the CE device 200 using RFID, e.g., by sending the codes from the POST RFID reader/writer 222 to the RFID device 208 of the CE device 200. At block 240 the CE device 200, which is ordinarily not energized (but whose RFID device 208 can still receive information from the RFID reader/writer 222 in accordance with RFID principles known in the art) at the POS, stores the codes without being energized, e.g., by storing the codes in memory of the RFID device 208.

After completing the transaction the CE device 200 is typically transported to the purchaser's premises and energized at block 242, at which time the processor 204 reads the enable codes from the RFID device 208. Proceeding to block 244, the CE device 200 uses the codes to enable the respective licensable components in accordance with disclosure above.

An alternative mode of transferring the license codes from the POST 214 to the CE device 200 is shown in FIG. 13. Commencing at block 246, the POST 214 receives the codes from the server 228 and then copies the codes to the thumb drive 224 of the POST at block 248. The thumb drive is removed from the POST and given to the purchaser at block 250 while still at the POS. Proceeding to block 252, when the purchaser arrives at his premises and energizes the CE device 200, the thumb drive is inserted into the CE device 200 and the codes thereon are read at block 254 by the processor 204 of the CE device 200. The corresponding licensable components are activated, and in some implementations the CE device 200 writes to the thumb drive an acknowledgement, encrypted if desired, that the licensable component has been activated. If desired, the purchaser may be prompted to remove the thumb drive from the CE device 200 at block 256 and send it back, to a manufacturer address or other appropriate address, which determines royalties at block 258 according to the codes found on the thumb drive. In this way, royalty payments are generated only if the purchaser sends the thumb drive back, from which it can be inferred that the licensable components have been activated/enabled.

Yet another mode of transferring the license codes from the POST 214 to the CE device 200 is shown in FIG. 14. Commencing at block 260, the POST 214 receives the codes from the server 228 and then at block 262 prints the codes as bar-type codes on, e.g., a substrate such as a sales slip using the printer 226 in FIG. 9. Upon initial energization of the CE device 200 at block 264 the purchaser can hold the substrate in front of the camera 210 of the CE device 200 shown, in FIG. 9. The CE device 200 reads the codes at block 266 and enables/activates the corresponding licensable components in accordance with principles discussed above.

In addition to the mechanisms mentioned above, after the POST gathers the list of features to be activated, it may send the list to an IP server or to a broadcast data download service which sends the activation, code to the device over a wired or wireless Internet connection.

Or, if desired to activate the licensable component(s) in the CE device, the POST can generate an activation message and send the message via voice telephony or telephony text message to the purchaser's landline telephone and/or wireless telephone. In the case of a voice activation message, the message may be configured to carry audible machine tone signaling such as facsimile signaling, modem signaling, or dual tone multiple frequency (DTMF) signaling. The audible tones, which represent activation codes, are captured by the telephone and presented to the purchaser for input to the CE device or directly into a microphone of the CE device or downloaded to the CE device through, e.g., a USB link with the telephone. In any case the CE device would then possess the necessary activation codes.

For activation codes sent to a wireless telephone as a text message, on the other hand, the user can read the message and then enter the activation data read by the user into the CE device using an appropriate user interface on the CE device.

Without limitation, the need for paying for licenses for the following technologies may be determined:

Video Decoders

MPEG-2 video, MPEG-2 video with optical disk, MPEG4 advanced video coding (AVC), MPEG4 Visual, MPEG video codec (VC) 1

Audio Decoders unified AAC (MPEG 2&4 AAC) 2ch, unified AAC (MPEG 2&4 AAC) 3ch, Dolby Digital AC3 2ch, Dolby Digital AC3 5.1ch, Dolby Digital Plus (DD+) 2ch, ProLogic2 (Surround Sound), MPEG audio 1&2 layer 1, 2, 3) MP3, DTS_Blueray disk (BD) (2CH/2CH+ Digital Out), BBE Sound, sound retrieval system (SRS) sound EPGs Gemstar Guide EPG, non-Gemstar EPG (SI-EPG)

Demodulators

Association of Radio Industries and Businesses (ARIB) (D+BS+CS); ATSC, digital video broadcasting (terrestrial) (DVB-T)

Other Components Including Digital Rights Management (DRM)

Joint Photographic Expert Group (JPEG), digital transmission content protection (DTCP)/AACP/Open MG, HDMI, System Synchronized Brightness Control (contrast enhancement), Inverter controller integrated circuit (IC), IEEE 802.11 wireless license, IEEE 802.11(n), BD Pool (player), BD Pool (recorder), digital video disk (DVD) format, IEEE 802.11/16, IEEE 1394

Software

JAVA, MHP/Ginga interactive TV software, JAVA-BD combination, DivX codec software, Windows Media Audio, Windows Media Video, Windows Media Network read, Windows Media digital rights management (DRM), audio watermark, Netfront, web browser software.

Additionally, production encryption keys and test encryption keys may be used to permit testing a licensable component in production, pre-sale, without triggering the above-described license request mechanisms. A TV may be placed in a test activation mode used only in the manufacturing or test phase, and if desired the test mode may have a hardwired time out. A test key or keys can be used to activate licensable, components and the license request algorithm recognizes a test key and responsive to the recognition does not request a license. The test activation mode may be hardwired to deactivate after a single power cycle and the TV processor may not permit reactivation of the test mode thereafter. Activation of a licensable component thereafter requires a production key which is associated with a license request.

While the particular ACTIVATING LICENSABLE COMPONENT OF CONSUMER ELECTRONIC DEVICE AT POINT OF SALE is herein shown and described in detail, it is to be understood that the subject matter which, is encompassed by the present invention is limited only by the claims.

What is claimed is:

1. Consumer electronics (CE) device comprising:
   processor controlling one or more licensable components, at least one of which requires a license code to enable, the license code not being available to the processor at a point of sale (POS) of the CE device until a transaction for the CE device has been satisfied;
   display controlled by the processor; and
   computer readable storage medium bearing instructions executable by the processor to:
   pursuant to satisfying the transaction, receive at least one license code associated with at least one licensable component, the license code being provided through a point of sale terminal (POST), the license code not having to be typed into the CE device by a person to make the license code available to the processor; and
   use the license code to enable operation of the licensable component, the licensed component not being enabled for operation without the license code.

2. The CE device of claim 1, wherein the processor-receives the license code from a radiofrequency identification (RFID) device communicating with the processor, the RFID device storing the license code received from an RFID device of the POST.

3. The CE device of claim 1, wherein the processor receives the license code from a removable storage medium removably engageable with the CE device, the removable storage medium storing the license code written to it by the POST.

4. The CE device of claim 1, wherein the processor receives the license code from an imaging device reading the license code from a substrate printed by a printer associated with the POST.

5. Point of sale terminal (POST), comprising:
   processor;
   computer readable storage medium accessible by the processor and bearing instructions to cause the processor to:
   receive at least one purchaser-desired feature of a consumer electronics (CE) device, the purchaser-desired feature implicating a license for a licensable component of the CE device;
   transmit data representing the purchaser-desired features to a server;
   receive from the server in response to the data representing the purchaser-desired features at least one license code; and provide the license code to the CE device and/or to a purchaser thereof.

6. The POST of claim 5, wherein the processor receives the purchaser-desired feature by means of a user interface (UI) presented on a display of the POST.

7. The POST of claim 6, wherein the UI indicates plural sources of content to be displayed on the CE device and the purchaser decides which of the sources of content the purchaser wishes to enable.

8. The POST of claim 6, wherein the UI indicates plural licensable components and the purchaser decides which of the licensable component the purchaser wishes to enable.

9. The POST of claim 5, wherein the POST causes a bar code representing the license code to be printed by a printer onto a substrate which can be provided to the purchaser.

10. The POST of claim 5, wherein the POST sends the license code to the CE device using RED.

11. The POST of claim 5, wherein the POST stores the license code on a removable memory medium that can be provided to the purchaser of the CE device for insertion thereof into the CE device.

12. Method comprising:
receiving, from a point of sale (POS) of a consumer electronics (CE) device, desired features of the CE device as defined by a purchaser of the CE device; and
using a terminal at the POS to provide to the CE device and/or the purchaser thereof at least one license code required to enable the feature to function on the CE device without requiring the license code to be typed into the CE device.

13. The method of claim 12, comprising correlating the desired features to one or more respective licensable components disabled in the CE device absent input of respective license codes associated with the respective licensable features to a processor of the CE device.

14. The method of claim 13, wherein a purchaser-desired feature of terrestrial antenna input is correlated town ATSC demodulator in the CE device requiring a respective license code to enable.

15. The method of claim 13, wherein a purchaser-desired feature of video disk input is correlated to a high definition content protect (HDCP) license event.

16. The method of claim 13, wherein a purchaser-desired feature of Internet use is correlated to a licensable component established by a Web browser.

17. The method of claim 12, comprising providing the license code to the CE device using RFID.

18. The method of claim 12, comprising providing the license code to the CE device using a removable storage medium.

19. The method of claim 12, comprising providing the license code to the CE device using at least one bar code printed onto a substrate readable by the CE device.

* * * * *